United States Patent [19]

Tamura

[11] Patent Number: 5,508,696
[45] Date of Patent: Apr. 16, 1996

[54] ROTATIONAL POSITION-DETECTING DEVICE

[75] Inventor: Masahiro Tamura, Kawasaki, Japan

[73] Assignee: Fujitsu Limited, Kanagawa, Japan

[21] Appl. No.: 147,640

[22] Filed: Nov. 4, 1993

[30] Foreign Application Priority Data

Nov. 4, 1992 [JP] Japan ................... 4-294760

[51] Int. Cl.$^6$ ................................ G08C 15/00
[52] U.S. Cl. .................. 340/870.38; 340/870.37; 324/658; 324/691
[58] Field of Search .................. 340/870.37, 870.38, 340/671, 672; 324/658, 660, 662, 691, 699

[56] References Cited

U.S. PATENT DOCUMENTS

| | | | |
|---|---|---|---|
| 3,353,098 | 11/1967 | Foster et al. | 340/870.37 |
| 3,541,435 | 11/1970 | Foster et al. | 324/662 |
| 3,584,579 | 6/1971 | Rothenberg | 324/662 |
| 3,736,647 | 6/1973 | Roeder et al. | 324/662 |
| 4,388,713 | 6/1983 | Tatsuguchi | 369/50 |
| 4,410,852 | 10/1983 | Guretzky | 340/870.37 |
| 4,757,489 | 7/1988 | Yamagishi | 369/50 |
| 4,931,887 | 6/1990 | Hegde et al. | 324/662 |

Primary Examiner—John K. Peng
Assistant Examiner—Daniel J. Wu

[57] ABSTRACT

A rotational position-detecting device detects the rotational position of various kinds of rotating shafts in an accurate and simplified manner. A parameter element is mounted on a rotating shaft of a motor or the like for providing a parameter which varies in a manner corresponding to the rotational position of the rotating shaft. The parameter element may be formed by a variable resistor a resistance of which varies in a manner corresponding to the rotational position of the rotating shaft, or alternatively by a variable capacitor a capacitance of which varies in a manner corresponding to same. An oscillator generates a signal having a frequency dependent on the resistance or capacitance of the parameter element. The oscillator may be formed by a VCO to which is applied voltage dependent on the resistance of the parameter element, to generate a signal having a frequency dependent on the applied voltage. Alternatively, the oscillator may be formed by an LC resonance circuit which generates a signal having a frequency dependent on the capacitance of the parameter element. The oscillating frequency of the oscillator bears one-to-one correspondence to the rotational position of the rotating shaft, and hence the latter is detected based on the former.

2 Claims, 5 Drawing Sheets

5,508,696

ROTATIONAL POSITION-DETECTING DEVICE

BACKGROUND OF THE INVENTION (1) Field of the Invention

The present invention relates to a rotational position-detecting device which is capable of detecting the rotational position of various types of rotating shafts in an accurate and simplified manner.

(2) Description of the Related Art

In general, the control of the rotational position of various types of rotating shafts, which is performed e.g. for remote directional control of an antenna, is carried out by detecting the rotational position of a rotating shaft and thereby stopping the rotating shaft in a specified rotational position. There are strong demands for low-cost implementation of such rotational position control of rotating shafts.

A particular rotational position of a rotating shaft can be detected by an optical detecting element or a magnetic detecting element arranged at a location corresponding to the particular rotational position of the rotating shaft. Therefore, it is possible to detect each of a plurality of rotational positions of the rotating shaft by providing a plurality of detecting elements of an above-mentioned type around the rotating shaft at locations each spaced by a predetermined interval of an angle of rotation and corresponding to the respective rotational positions of the rotating shaft. However, to detect the rotational position more finely or at reduced intervals of the angle of rotation, it is required to provide a very large number of detecting elements, which makes a device employing this rotational position detecting method impractical.

Therefore, conventional rotational position-detecting devices generally use an encoder provided on a rotating shaft. The encoder comprises a disc mounted on the rotating shaft, which is formed with through holes spaced at precisely identical circumferential intervals, and a light emitting block and a light receiving block with the disc interposed therebetween. The light emitting block emits a light ray toward the light receiving block, while the light receiving block receives the light ray transmitted thereto from the light emitting block via each of the through holes of the disc, and delivers a pulse signal in response to the incident light ray. Pulse signals thus produced are counted starting from one corresponding to a predetermined reference rotational position of the rotating shaft. This makes it possible to detect the rotational position of the rotating shaft by resolution corresponding to an interval between adjacent ones of the through holes of the disc.

To enhance resolution in the detection of the rotational position of the rotating shaft, however, the conventional encoder is required to have a disc formed with a large number of through holes spaced at precisely identical intervals, which is disadvantageous in that the manufacturing cost of such a disc is very high.

Further, in remote control of a rotating shaft, an output signal from the encoder is required to be transmitted to a distant location. If the rotational speed of the rotating shaft is not uniform, the output signal from the encoder contains pulses occurring at largely-varying intervals. The transmission of such a pulse signal requires a signal transmitting system which is complicated in construction. Further, if remote control of a device or a system should be performed by controlling the rotational positions of a plurality of rotating shafts used therein, an encoder is required to be provided for each of the rotating shafts, and output signals from the encoders must be transmitted to a distant location, which is disadvantageous in that the whole remote control system becomes even more complicated and expensive.

Further, to detect a particular rotational position of the rotational shaft, it is necessary to know the number of pulses generated during rotation of the rotating shaft from the aforementioned reference position to the particular rotational position to be detected, and hence it is required to constantly store results of detection performed on the preceding occasion, in order to detect the rotational position of the rotating shaft in a continuous manner.

SUMMARY OF THE INVENTION

It is a first object of the invention to provide a rotational position-detecting device which is simple in construction for realizing enhanced resolution in the detection of the rotational position of a rotating shaft, and can be manufactured at a reduced cost.

It is a second object of the invention to provide a rotational position-detecting device which is simplified in construction of a signal transmitting system used for remote control of the rotational position of a rotating shaft, and can be manufactured at a reduced cost.

It is a third object of the invention to provide a rotational position-detecting device which need not store results of detection of the rotational position of a rotating shaft performed on the preceding occasion.

To attain the above objects, according to a first aspect of the invention, there is provided a rotational position-detecting device for detecting a rotational position of a rotating shaft, comprising:

a variable resistance element offering a resistance variable in a manner corresponding to the rotational position of the rotating shaft;

oscillator means for generating a signal having a frequency dependent on a voltage applied thereto depending on the resistance of the variable resistance element; and rotational position-detecting means for detecting the rotational position of the rotating shaft based on the frequency of the signal generated by the oscillator means.

To attain the above objects, according to a second aspect of the invention, there is provided a rotational position-detecting device for detecting a rotational position of a rotating shaft, comprising:

a variable capacitance element having a capacitance variable in a manner corresponding to the rotational position of the rotating shaft;

oscillator means for generating a signal having a frequency dependent on the capacitance of the variable capacitance element; and rotational position-detecting means for detecting the rotational position of the rotating shaft based on the frequency of the signal generated by the oscillator means.

To attain the above objects, particularly the second object, according to a third aspect of the invention, there is provided a rotational position-detecting device for detecting rotational positions of a plurality of rotating shafts, comprising:

a plurality of variable resistance elements provided for the plurality of rotating shafts for offering resistances variable in a manner corresponding to the rotational positions of the plurality of rotating shafts, respectively;

a plurality of oscillator means provided in a manner corresponding to the plurality of variable resistance elements for generating signals having frequencies dependent on voltages applied thereto depending on the resistances of the plurality of variable resistance elements, respectively, such that the frequencies of the signals belong to respective different frequency bands having no overlapping portions;

signal transmitting means for composing the signals having the frequencies delivered from the plurality of oscillator means into a composite signal, and transmitting the composite signal;

separator means having pass bands corresponding to the respective different frequency bands of the signals generated by the plurality of oscillator means, for separating the composite signal transmitted thereto from the signal transmitting means into separate signals according to frequency; and a plurality of rotational position-detecting means provided in a manner corresponding to the plurality of oscillator means for detecting the rotational positions of corresponding ones of the plurality of rotating shafts based on frequencies of corresponding ones of the separate signals delivered from the separator means, respectively.

To attain the above objects, particularly the second object, according to a fourth aspect of the invention, there is provided a rotational position-detecting device for detecting rotational positions of a plurality of rotating shafts, comprising:

a plurality of variable capacitance elements provided for the plurality of rotating shafts for having capacitances variable in a manner corresponding to the rotational positions of the plurality of rotating shafts, respectively;

a plurality of oscillator means provided in a manner corresponding to the plurality of variable capacitance elements for generating signals having frequencies dependent on the capacitances of the plurality of variable capacitance elements, respectively, such that the frequencies of the signals belong to respective different frequency bands having no overlapping portions;

signal transmitting means for composing the signals having the frequencies delivered from the plurality of oscillator means into a composite signal, and transmitting the composite signal;

separator means having pass bands corresponding to the respective different frequency bands of the signals generated by the plurality of oscillator means, for separating the composite signal transmitted thereto from the signal transmitting means into separate signals according to frequency; and a plurality of rotational position-detecting means provided in a manner corresponding to the plurality of oscillator means for detecting the rotational positions of corresponding ones of the plurality of rotating shafts based on frequencies of corresponding ones of the separate signals delivered from the separator means, respectively.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
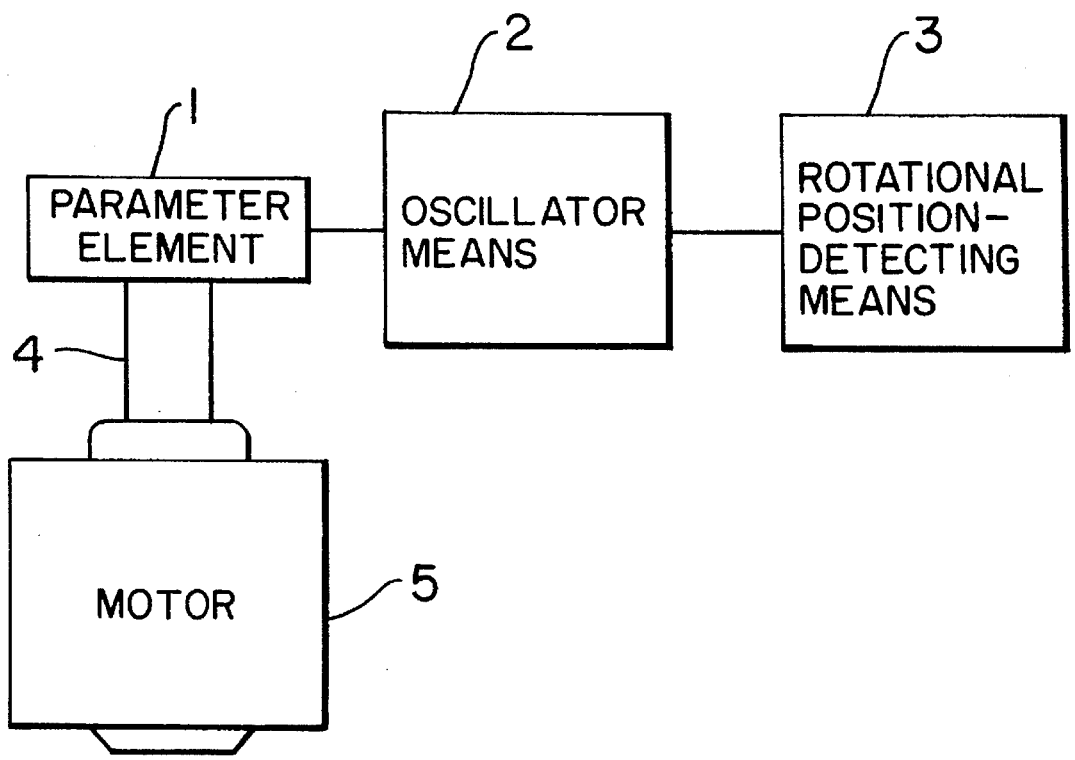
FIG. 1 is a diagram illustrating the principle of the present invention.

Prior to detailed description of preferred embodiments of the invention, the operating principle of a rotational position-detecting device according to the invention will be described with reference to FIG. 1.

The rotational position-detecting device of the present invention has a parameter element 1 arranged on a rotating shaft 4 of a motor 5 or the like for providing a parameter which varies in a manner corresponding to variation in the rotational position of the rotating shaft 4. The parameter element 1 is formed e.g. by a variable resistor a resistance of which varies in a manner corresponding to the rotational position of the rotating shaft 4, or by a variable capacity capacitor a capacitance (an electrostatic capacity) of which varies in a manner corresponding to the rotational position of the rotating shaft 4. Oscillator means 2 connected to the parameter element 1 generates a signal having a frequency dependent on the resistance or capacitance of the parameter element 1. The oscillator means 2 is formed by a voltage controlled oscillator which generates a signal having a frequency dependent on voltage applied thereto from a voltage source, not shown, in a manner corresponding to the resistance of the parameter element 1. Alternatively, the oscillator means 2 is formed by an LC resonance circuit which generates a signal having a frequency dependent on the capacitance of the parameter element 1. The oscillating frequency of the oscillator means 2 bears one-to-one correspondence to the rotational position of the rotating shaft 4, and hence rotational position-detecting means 3 detects the rotational position of the rotating shaft 4 based on the oscillating frequency of the oscillator means 2, i.e. based on the frequency of the signal delivered therefrom.

To detect rotational positions of a plurality of rotating shafts, a plurality of parameter elements are provided for the respective rotating shafts, with a plurality of oscillator means corresponding thereto. These oscillator means are adapted to generate signals having frequencies belonging to respective different frequency bands having no overlapping portions. The signals generated by the plurality of oscillator means and having frequencies different from each other are formed into a composite signal by signal transmitting means for transmission of same to a remote location.

At the remote location to which the composite signal is transmitted, there is provided a plurality of separator means each comprised of a band-pass filter having a pass band corresponding to one of the frequency bands to which the signals generated by the plurality of oscillator means belong, respectively, for forming the composite signal into separate signals according to frequency. These separator means are connected to a plurality of rotational position-detecting means corresponding to the plurality of oscillator means for detecting the rotational positions of corresponding ones of the plurality of rotating shafts based on frequencies of corresponding ones of the separate signals, respectively.

Figure 2:
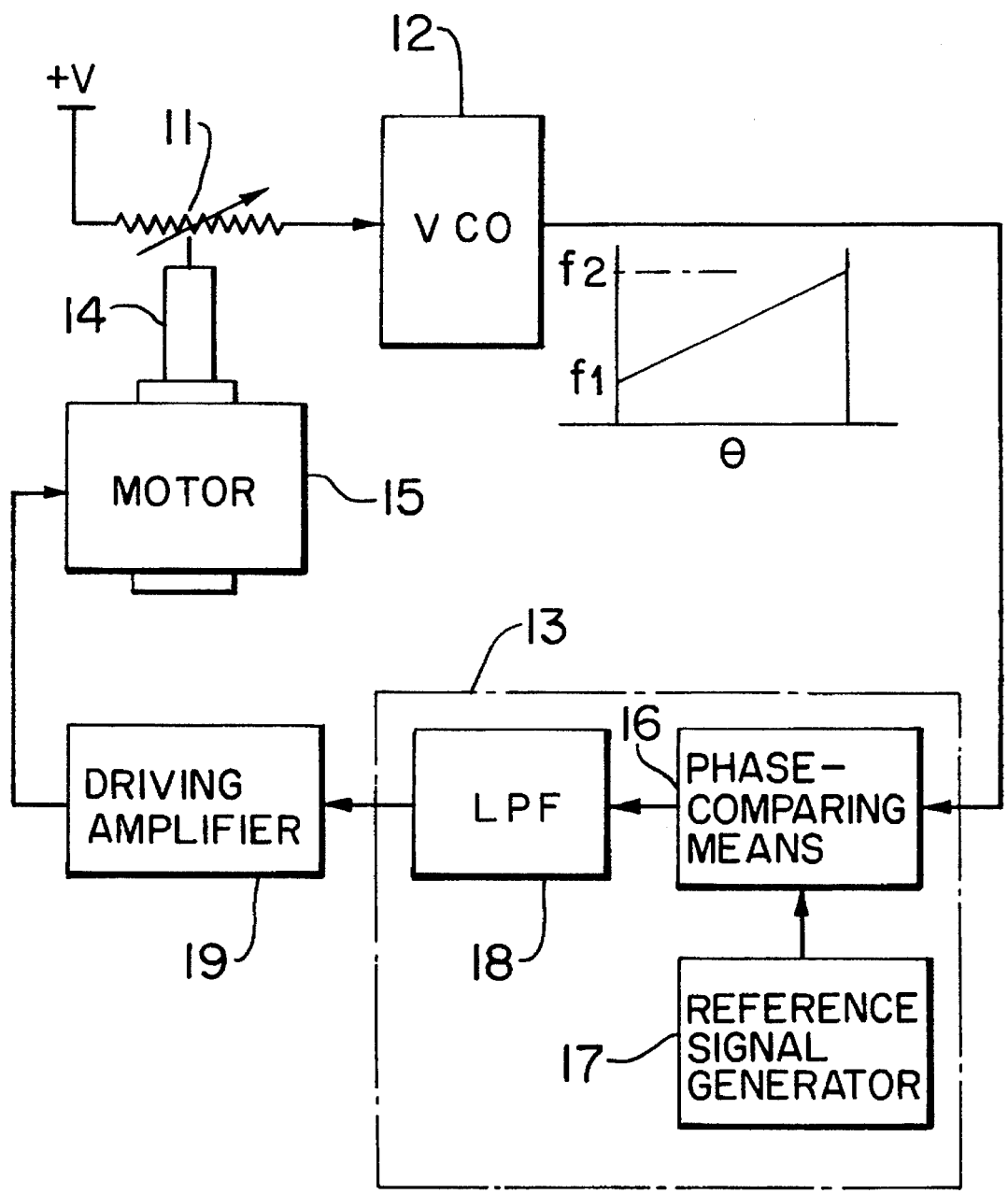
FIG. 2 is a diagram illustrating a first embodiment of the present invention.
Figure 3:
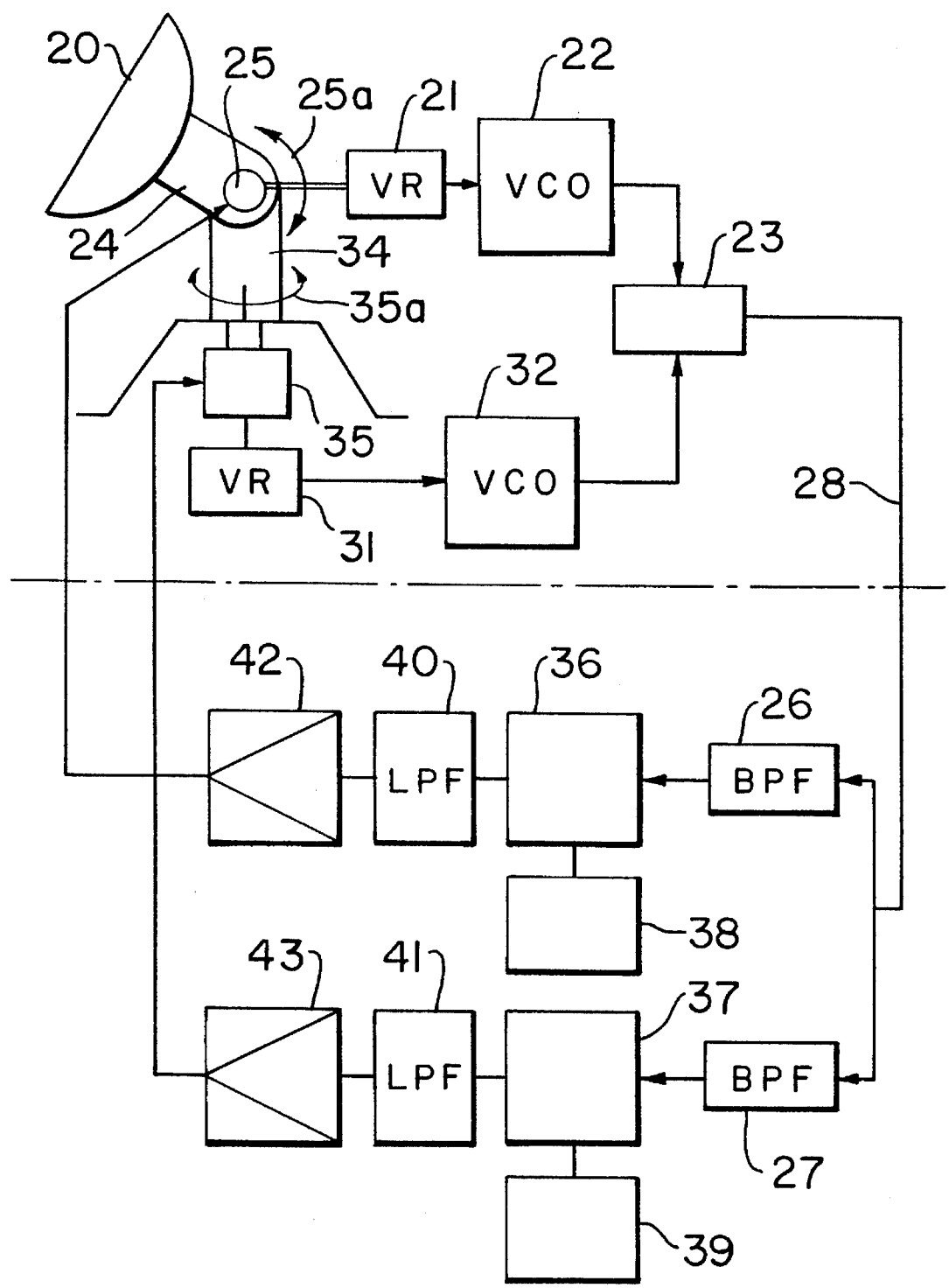
FIG. 3 is a diagram illustrating a second embodiment of the present invention.
Figure 4:
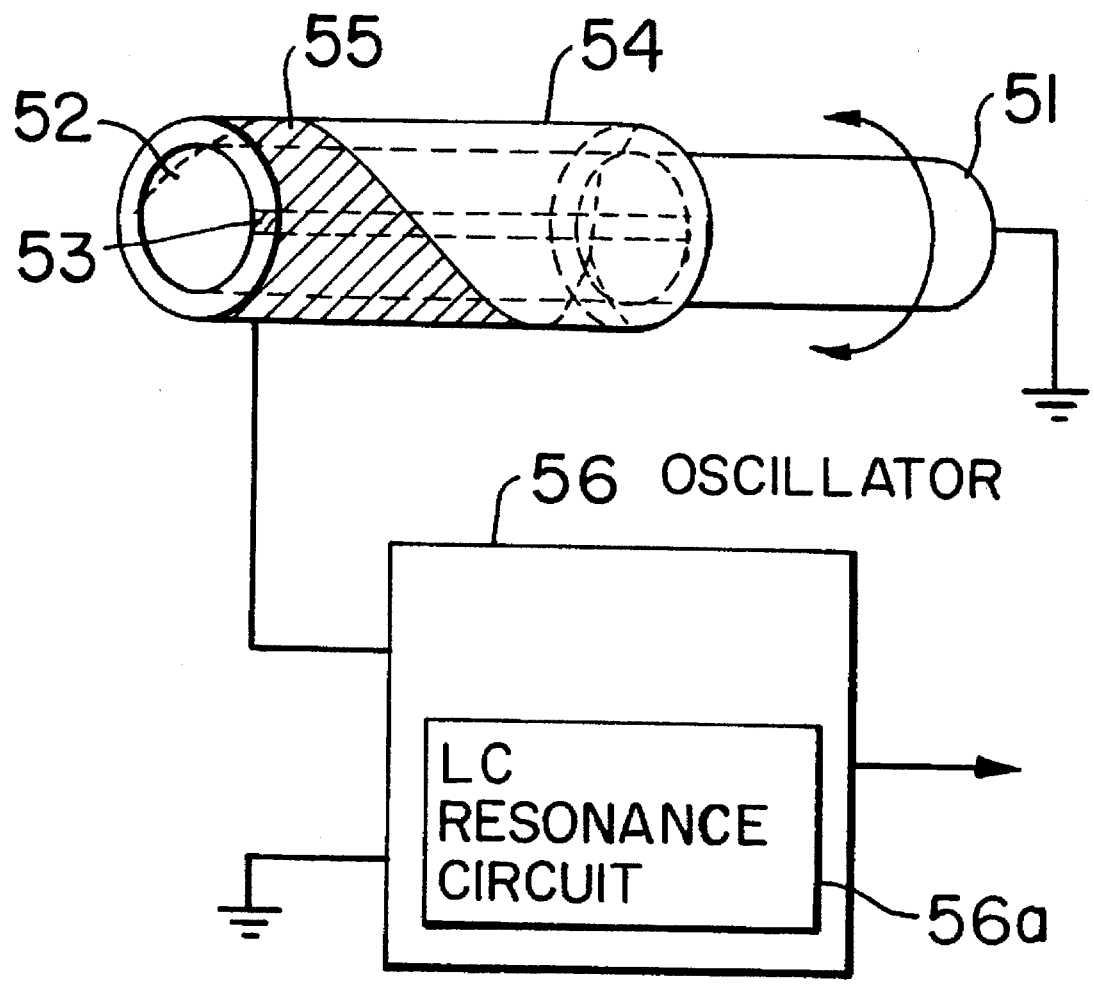
FIG. 4 is a diagram illustrating essential parts of a third embodiment of the present invention.

Next, the present invention will be described with reference to FIG. 2 to FIG. 4 illustrating the preferred embodiments thereof.

FIG. 2 shows a rotational position-detecting device according to a first embodiment of the invention, which comprises a variable resistor 11 as the parameter element, a voltage controlled oscillator (VCO) 12 as the oscillator means, a rotation control block 13 formed by phase comparing means 16, a reference signal generator 17 and a low-pass filter (LPF) 18, a rotating shaft 14, a motor 15, a drive amplifier 19, and a control voltage source the source voltage of which is indicated by a symbol +V.

The variable resistor 11 is mounted on the rotating shaft 14 of the motor 15, and the source voltage +V is applied via the variable resistor 11 to the voltage controlled oscillator 12. The variable resistor 11 is constructed such that the inner surface of a hollow cylinder is coated with carbon, and a rotational contact, which is cooperatively associated with the rotating shaft 14 such that it rotates about the axis of the hollow cylinder, is brought into contact with the carbon-coated inner surface of the hollow cylinder. The variable resistor 11 offers a value of resistance corresponding to the rotational position of the rotating shaft 14. This causes control voltage corresponding to the rotational position of the rotating shaft 14 to be applied to the voltage controlled oscillator 12, which in turn generates a signal having a frequency dependent on the control voltage applied thereto. The oscillating frequency of the voltage controlled oscillator 12 varies in a manner corresponding to an angle θ of rotation of the rotating shaft from a reference position thereof, e.g. from f1 to f2 as shown in FIG. 2. The characteristic of variation in a value of resistance of the variable resistor 11 is selected based on the control voltage applied to the voltage controlled oscillator 12 such that the frequency f1 to f2 bears a linear relationship with the angle θ of rotation of the rotating shaft.

The reference signal generator 17 is used for setting a desired rotational position of the rotating shaft 14 to bring the rotating shaft 14 into the desired position. The reference signal generator 17 is formed e.g. by a frequency synthesizer which is adapted to generate a reference signal having a frequency (in a range of f1 to f2) corresponding to an angle (in a range of 0 to 360 degrees) indicative of a set rotational position of the rotating shaft 14. The phase-comparing means 16 compares the phase of the reference signal delivered from the reference signal generator 17 with the phase of the output signal delivered from the voltage controlled oscillator 12, and generates a phase difference signal corresponding to a difference in frequency between these signals. The low-pass filter 18 removes high frequency components from the phase difference signal and delivers the resulting signal to the drive amplifier 19 as an error signal.

Insofar as there is a difference in frequency between the output signal from the voltage controlled oscillator 12 and the reference signal from the reference signal generator 17, the drive amplifier 19 drives the motor 15 to cause the rotating shaft 14 to rotate. The motor 15 is formed e.g. by an AC servomotor, and supplied with a velocity signal from the drive amplifier 19. The resistance of the variable resistor 11 varies in a manner corresponding to the rotational position of the rotating shaft 14, and hence the oscillating frequency of the voltage controlled oscillator 12 varies in a manner corresponding thereto. When the oscillating frequency of the voltage controlled oscillator 12 becomes equal to the frequency of the reference signal delivered from the reference signal generator 17, the error signal ceases to be generated, so that the motor 15 is no longer driven for rotation of the rotating shaft 14. Thus, the rotating shaft 14 can be stopped to a desired rotational position, which is set by means of the reference signal generator 17. Further, the motor 15 may be formed by a stepping motor which rotates through an angle corresponding to the number of signal pulses input thereto, with a pulse generator being interposed between the low-pass filter 18 and the drive amplifier 19, for generating a number of pulses corresponding to the phase difference between the output signal from the voltage controlled oscillator 12 and the reference signal from the reference signal generator 17.

The center frequency of a variable range (band) of the oscillating frequency of the voltage controlled oscillator 12 can be set to a desired frequency, e.g. in the range of several hundred KHz to several MHz. Further, the bandwidth of the oscillating frequency can be selected as desired. Assuming, for instance, that the oscillating frequency varies within a range of ±18 KHz with respect to the center frequency during one rotation of the rotating shaft 14, the oscillating frequency undergoes a change of 100 Hz whenever the rotating shaft 14 rotates through one degree. Therefore, if the rotation control block 13 is capable of discriminating the frequency of signals with high accuracy, the rotational position-detecting device of the present embodiment can have a sufficient resolution for an angle of rotational of the rotating shaft, which is smaller than one degree.

Further, in place of the rotation control block 13 and the drive amplifier 19 of the above embodiment, there may be provided a frequency discriminator which generates an output signal having voltage proportional to a deviation of an actual value of the oscillating frequency of the voltage controlled oscillator 12 from a predetermined center frequency, and an indicator which indicates an angle of rotation of the rotating shaft 14 corresponding to voltage applied thereto, whereby the oscillating frequency of the voltage controlled oscillator 12 may be discriminated by the frequency discriminator, and the output signal therefrom may be used to indicate an angle of rotation of the rotating shaft from a reference central rotational position thereof. In this case, whatever rotational position the rotating shaft 14 may be brought into, the voltage controlled oscillator 12 generates a signal having a frequency corresponding to the rotational position of the rotating shaft 14, which makes it possible to detect an angle of rotation of the rotating shaft 14 in a continuous manner.

Further, although the above embodiment is adapted to detect the rotational position of the rotating shaft 14 of the motor 15, to detect the rotational position of a rotating shaft driven for rotation by the motor via a gear and the like, the aforementioned variable resistor is mounted on this rotating shaft. In this case, the drive amplifier for the motor may be adapted to perform ON/OFF control of drive current supplied to the motor such that when the error signal is reduced to zero, the drive current is cut off.

Further, although, in the above embodiment, the output from the variable resistor 11 is applied to the voltage controlled oscillator 12 for generation of an oscillating signal, this is not limitative, but the variable resistor may be used for a resistance of an oscillator formed by a CR oscillating circuit to permit generation of an oscillating signal. In this case, however, it is not easy to increase the oscillating frequency of the oscillator.

FIG. 3 shows a rotational position-detecting device according to a second embodiment of the invention. The rotational position-detecting device of this embodiment comprises a parabolic antenna 20, variable resistors (VR's) 21, 31, voltage controlled resistors (VCO's) 22, 32, a synthesizer 23, a wave angle arm 24, a mast 34, motors 25, 35, band-pass filters (BPF's) 26, 27 which have pass bands different from each other, a signal line 28, phase comparing means 36, 37, reference signal generators 38, 39, low-pass filters (LPF's) 40, 41, and drive amplifiers 42, 43.

The parabolic antenna 20 is fixed to one end of the wave angle arm 24 supported by one end of the mast 34. The mast 34 is driven for rotation by the motor 35 in directions indicated by a two-headed arrow 35a, while the wave angle arm 24 by the motor 25 in directions indicated by a two-headed arrow 25a. This arrangement enables parabolic antenna 20, which is installed on a rooftop, an antenna tower or the like, to be directed in a direction determined by a wave angle and a azimuth angle, as desired.

The variable resistor 21 is constructed such that a resistance thereof varies in a manner corresponding to the rotational position of a rotating shaft of the motor 25, while the variable resistor 31 is constructed such that a resistance thereof varies in a manner corresponding to the rotational position of a rotating shaft of the motor 35. The voltage controlled oscillators 22, 32 have control voltage applied thereto from voltage sources, not shown, via the variable resistors 21, 31, respectively.

The bands of the oscillating frequencies of the voltage controlled oscillators 22, 32 are selected such that they do not overlap each other. Assuming, for instance, that the center frequency of a band to which belongs the oscillating frequency of the voltage controlled oscillator 22 is F1, with the extents of variation of the oscillating frequency from the center frequency F1 being designated by ±ΔF1, while the center frequency of a band to which belongs the oscillating frequency of the voltage controlled oscillator 32 is F2 (> F1), with the extents of variation of the oscillating frequency F2 from the center frequency being designated by ±ΔF2, the center frequencies F1 and F2 are selected to satisfy the relationship of (F1+ ΔF1)< (F2−ΔF2).

The oscillating frequency of the voltage controlled oscillator 22 corresponds to the rotational position of the rotating shaft of the motor 25, i.e. the wave angle of the parabolic antenna 20, while the oscillating frequency of the voltage controlled oscillator 32 corresponds to the rotational position of the rotating shaft of the motor 35, i.e. the azimuth angle of the parabolic antenna 20. Since the bands of the oscillating frequencies of the two oscillators do not overlap each other, output signals therefrom can be formed into a composite signal by the synthesizer 23 in a manner equivalent to frequency-division multiplexing, and the composite signal can be transmitted via the signal line 28, which is single. Therefore, it is possible to transmit two signals indicative of the wave angle and the azimuth angle of the parabolic antenna 20 set up on the rooftop, the antenna tower or the like, by the single signal line 28, to a desired remote location at which a control panel is installed for operating the rotational position-detecting device. The control panel is associated with at least the band-pass (low-pass) filters 26, 27, the phase comparing means 36, 37, the reference signal generators 38, 39, and so forth. The wave angle and the azimuth angle are set to the reference signal generators 38, 39 via the control panel. In addition, if there are a plurality of parabolic antennas set up to be controlled, voltage controlled oscillators, which have bands of oscillating frequency selected such that none of the bands overlap each other, may be provided for detecting the wave angle and azimuth angle of each of the antennas, and then all the output signals from the voltage controlled oscillators are formed into a composite signal by a synthesizer, for transmission by way of a single signal line.

When a wave angle is set via the control panel to the reference signal generator 38, and similarly an azimuth angle is set via same to the reference signal generator 39, a signal having a reference frequency corresponding to the set wave angle is delivered from the reference signal generator 38 to the phase comparing means 36, and a signal having a reference frequency corresponding to the set azimuth angle from the reference signal generator 39 to the phase comparing means 37.

The composite signal transmitted via the signal line 28 is formed into separate signals by the band-pass filters 26, 27. The band-pass filters 26, 27 have pass bands which are substantially identical to the bands of the oscillating frequencies of the voltage controlled oscillators 22, 32, respectively. By virtue of operations of these band-pass filters 26, 27, one of the separate signals, which is substantially identical to the output signal from the voltage controlled oscillator 22, is supplied to the phase comparing means 36, while the other of the separate signals, which is substantially identical to the output signal from the voltage controlled oscillator 32, is supplied to the phase comparing means 37.

The phase comparing means 36 generates a signal corresponding to a difference between the set wave angle and the actual wave angle of the parabolic antenna 20, while the phase comparing means 37 generates a signal corresponding to a difference between the set azimuth angle and the actual azimuth angle of same, with these two signals being supplied to the low-pass filters 40, 41, respectively. The low-pass filters 40, 41 remove high frequency components from the signals to deliver the resulting error signals to the drive amplifiers 42, 43, where they are amplified and then delivered to the motors 25, 35, respectively. Similarly to the first embodiment, the motors 25, 35 are driven until the errors signals are reduced to zero.

In addition, the drive amplifiers 42, 43, may be provided in the vicinity of the motors 25, 35, with signal lines provided for connection between the drive amplifiers 42, 43 and the low-pass filters 40, 41, respectively.

Further, although the variable resistors 21 and 31 are arranged on the rotating shafts of the motors 25 and 35, respectively, in the second embodiment, this is not limitative, but they may be arranged on the rotating shafts on which the wave angle arm 24 and the mast 34 rotate. In this case, the drive of the motors 25 and 35 are performed e.g. by on/off control.

FIG. 4 shows essential parts of a rotational position-detecting device according to a third embodiment of the invention. Although the rotational position of each rotating shaft is detected by the use of a variable resistance element in the above two preferred embodiments, the rotational position-detecting device of the third embodiment employs a variable capacitance element for detecting the rotational position of a rotating shaft.

A rotary hollow cylinder 52 formed by an insulator is fixed to a rotating shaft 51. The rotary hollow cylinder 52 has an outer peripheral surface thereof formed with a linear electrode 53 along the axis of the cylinder. Further, a fixed hollow cylinder 54 formed by an insulator is arranged to enclose the rotary hollow cylinder 52 such that they are radially spaced by a predetermined distance. The fixed hollow cylinder 54 has an inner peripheral surface thereof formed with a triangular electrode 55 as indicated by hatching in FIG. 4. Thus, there is created a capacitance (an electrostatic capacity) between the electrodes 53 and 55, which varies as the rotational position of the rotating shaft 51 changes. The variable capacitor having such a construction is used as the parameter element 1 described hereinabove with reference to FIG. 1.

Reference numeral 56 designates an oscillator formed by an LC resonance oscillator having an LC resonance circuit 56a which uses the variable capacitor described above, to generate a signal having a frequency corresponding to the rotational position of the rotating shaft 51. This signal is used in the same manner as described with the first embodiment to detect and/or control the rotational position of the rotating shaft 51 based on the frequency thereof.

In place of the variable capacitor used in the third embodiment, which utilizes the fact that an area of two electrodes facing each other varies with rotation of the rotary hollow cylinder 52 relative to the fixed hollowing cylinder 54 enclosing the rotary hollow cylinder 52, there may be used a variable capacitor which is comprised of a fixed hollow cylinder having an electrode, a moving hollow cylinder having an electrode, which is capable of moving within the fixed hollow cylinder along the axis thereof, and a worm gear which converts the rotation of the rotating shaft into linear motion of the moving hollow cylinder. In this variation of the variable capacitor, the moving hollow cylinder moves within the fixed hollow cylinder along the axis thereof as the rotating shaft rotates, to vary an area of the two electrodes facing each other, which results in a predetermined variation in the capacitance of the capacitor.

Further, although a dielectric interposed between the two electrodes is air in the third embodiment described above, this is not limitative, but a dielectric having a high dielectric constant may be interposed between the electrodes to increase a degree of variation in the capacitance of the capacitor, provided that the rotational speed of the rotating shaft 51 is low.

Figure 5:
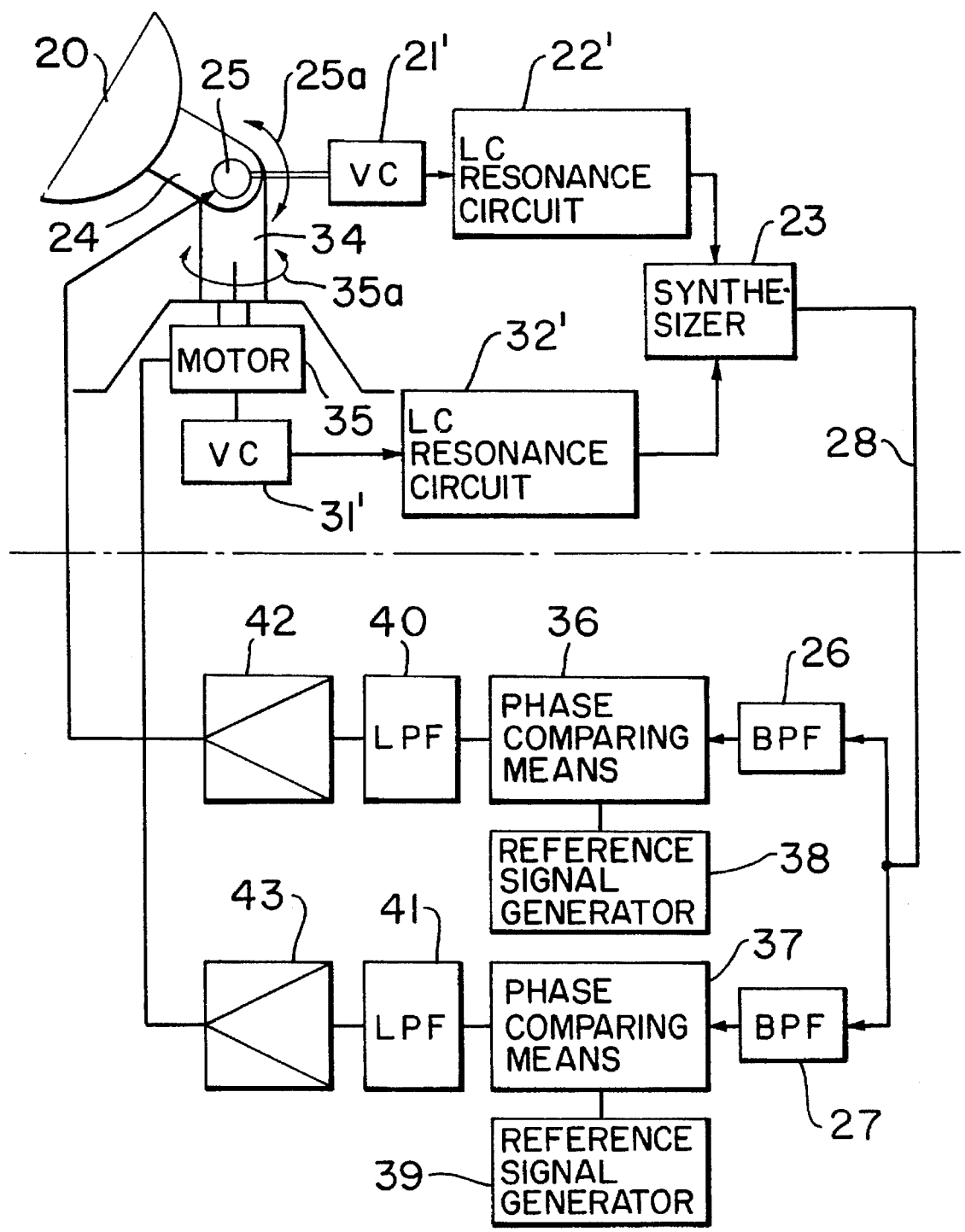
FIG. 5 is a diagram illustrating a further embodiment of the present invention.

Further, similarly to the second embodiment shown in FIG. 3, there may be used a plurality of variable capacitors VC 21', 31', and oscillators having LC resonance circuits 22', 32', for detecting rotational positions of a plurality of rotating shafts as shown in FIG. 5.

As described heretofore, the rotational position-detecting device according to the present invention uses oscillator means for generating a signal having a frequency corresponding to the rotational position of a rotating shaft, and a band of the oscillating frequency of the oscillator means can be set as desired. Therefore, the present rotational position-detecting device is capable of enhancing resolution in detection of the rotational position of the rotating shaft, on the basis of a simple construction thereof, and hence at reduced manufacturing costs.

Further, the rotational position-detecting device according to the invention is constructed such that it employs transmitting means enabling transmission of a plurality of signals indicative of respective rotational positions of a plurality of rotating shafts, by a single signal line, which leads to simplified construction and a reduced manufacturing cost of a signal transmitting system.

Further, according to the present invention, the oscillating frequency of the oscillator means has one-to-one correspondence with the rotational position of a rotating shaft, which makes it unnecessary to store results of the preceding detection as is the case with conventional rotational position-detecting devices.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A rotational position-detecting device for detecting rotational positions of a plurality of rotating shafts, comprising:

a plurality of variable resistance elements provided for said plurality of rotating shafts for offering resistances variable in a manner corresponding to said rotational positions of said plurality of rotating shafts, respectively;

a plurality of oscillator means provided in a manner corresponding to said plurality of variable resistance elements for generating signals having frequencies dependent on voltages applied thereto depending on said resistances of said plurality of variable resistance elements, respectively, such that said frequencies of said signals belong to respective different frequency bands having no overlapping portions;

signal transmitting means for composing said signals having said frequencies delivered from said plurality of oscillator means into a composite signal, and transmitting said composite signal;

separator means having pass bands corresponding to said respective different frequency bands of said signals generated by said plurality of oscillator means, for separating said composite signal transmitted thereto from said signal transmitting means into separate signals according to frequency; and a plurality of rotational position-detecting means provided in a manner corresponding to said plurality of oscillator means for detecting said rotational positions of corresponding ones of said plurality of rotating shafts based on said frequencies of corresponding ones of said separate signals delivered from said separator means, respectively.

2. A rotational position-detecting device for detecting rotational positions of a plurality of rotating shafts, comprising:

a plurality of variable capacitance elements provided for said plurality of rotating shafts for having capacitance variable in a manner corresponding to said rotational positions of said plurality of rotating shafts, respectively;

a plurality of oscillator means provided in a manner corresponding to said plurality of variable capacitance elements for generating signals having frequencies dependent on said capacitances of said plurality of variable capacitance elements, respectively, such that said frequencies of said signals belong to respective different frequency bands having no overlapping portions;

signal transmitting means for composing said signals having said frequencies delivered from said plurality of oscillator means into a composite signal, and transmitting said composite signal;

separator means having pass bands corresponding to said respective different frequency bands of said signals generated by said plurality of oscillator means, for separating said composite signal transmitted thereto from said signal transmitting means into separate signals according to frequency; and a plurality of rotational position-detecting means provided in a manner corresponding to said plurality of oscillator means for detecting said rotational positions of corresponding ones of said plurality of rotating shafts based on said frequencies of corresponding ones of said separate signals delivered from said separator means, respectively.

* * * * *